3,274,218
SUBSTITUTED TETRAHYDROFURANS
James Harold Short, Lake Forest, Ill., assignor to Abbott Laboratories, North Chicago, Ill., a corporation of Illinois
No Drawing. Filed Aug. 20, 1964, Ser. No. 391,037
8 Claims. (Cl. 260—347.7)

This invention relates to certain tetrahydrofurans of the Formula A

In this and succeeding formulas, R is halogen, loweralkyl or lower alkoxy wherein the alkyl and alkoxy radicals contain from 1 to 4 carbon atoms, inclusive. These compounds are high boiling liquids useful in lowering the blood cholesterol level. In a representative operation when an oral dose of 38 mg./kg. of the compound wherein R in Formula A was chlorine was administered to mice, there was a 26% reduction in the amount of cholesterol in the blood compared to a control group of mice fed a cholesterol rich diet only. These compounds are also antidepressants and can be used advantageously at a dosage of 10 mg./kg. or more for this purpose.

The new compounds can be readily prepared by refluxing in an inert solvent equimolar amounts of a Grignard compound of the formula $$BrMg-C_6H_4-OCH_2CH_2N(C_2H_5)_2$$

and a butyrophenone of the formula to form a Grignard complex which is then hydrolyzed with a saturated aqueous ammonium chloride solution to evolve hydrogen chloride and form the tetrahydrofuran ring. The mixture is filtered and the solvent layer fractionally distilled under reduced pressure to obtain the desired product.

The following examples set forth the best mode of carrying out the method of the invention.

Example 1

[R of Formula A is p-bromo]

A solution of 27 grams (0.1 mole) of p-bromophenyl 2-diethylaminoethyl ether in 100 ml. of dry tetrahydrofuran and 2.4 grams (0.1 mole) of magnesium turnings were heated under reflux until the reaction started. The heat was then removed until the reaction ceased after which refluxing was continued for two hours. Thereafter, a solution of 26 grams (0.1 mole) of p-bromo-γ-chlorobutyrophenone in 50 ml. of dry tetrahydrofuran was added slowly to the Grignard compound and the resulting solution refluxed for two hours. The reaction flask was then cooled in an ice bath and the Grignard complex formed was hydrolyzed by the dropwise addition of 15 ml. of a saturated aqueous ammonium chloride solution. After filtering, the solvent layer was separated, dried over magnesium sulfate and fractionally distilled to obtain the desired p-bromo product which boiled at 224°–230° C. at 1 mm. and had a refractive index $n_D^{25}$ of 1.5740.

Example 2

[R of Formula A is p-chloro]

The same Grignard compound prepared in Example 1 was refluxed with an equimolar amount of p,γ-dichlorobutyrophenone to obtain the p-chloro derivative which when fractionally distilled was found to boil at 225°–231° C. at 1.3 mm. and had a refractive index $n_D^{25}$ of 1.5637.

Example 3

[R of Formula A is p-fluoro]

By substituting p-fluoro-γ-chlorobutyrophenone in Example 1, the p-fluoro compound was obtained. B.P. =200°–203° C. at 0.8 mm.; $n_D^{25}$=1.5452.

Example 4

[R of Formula A is p-teritarybutyl]

The reaction of p-t-butyl-γ-chlorobutyrophenone with the Grignard reagent prepared in Example 1 produced the p-tertiarybutyl derivative boiling at 231°–234° C. at 1.3 mm. and having a refractive index $n_D^{25}$ of 1.5442.

In like manner, the reaction of other butyrophenones such as o-Methyl-γ-chlorobutyrophenone
p-Isopropoxy-γ-chlorobutyrophenone
o-Ethoxy-γ-chlorobutyrophenone
p-Methoxy-γ-chlorobutyrophenone
o-Chloro-γ-chlorobutyrophenone
m-Bromo-γ-chlorobutyrophenone
p-Ethyl-γ-chlorobutyrophenone
p, n-Butyl-γ-chlorobutyrophenone
m-Iodo-γ-chlorobutyrophenone or
m-methoxy-γ-chlorobutyrophenone with the same Grignard compound prepared in Example 1 will produce other compounds corresponding to Formula A wherein R is o-methyl, p-isopropoxy, o-ethoxy, p-methoxy, o-chloro, m-bromo, p-ethyl, p,n-butyl, m-iodo and m-methoxy, respectively.

I claim:
1. A compound of the formula in which R is a member of the group consisting of halogen, loweralkyl and loweralkoxy.
2. A compound as claimed in claim 1 in which R is p-bromo.
3. A compound as claimed in claim 1 in which R is p-chloro.
4. A compound as claimed in claim 1 in which R is p-fluoro.
5. A compound as claimed in claim 1 in which R is p-tertiarybutyl.
6. A compound as claimed in claim 1 in which R is halogen.
7. A compound as claimed in claim 1 in which R is loweralkyl.
8. A compound as claimed in claim 1 in which R is loweralkoxy.

References Cited by the Examiner

Annual Report Progress of Chemistry, vol. 42, pp. 163–64, 1945.
Noller: Chemistry of Organic Compounds, 2nd ed. (1957), pp. 437–438.

NICHOLAS S. RIZZO, *Primary Examiner.*
HENRY R. JILES, *Examiner.*
J. H. TURNIPSEED, *Assistant Examiner.*